United States Patent [19]

Wilhelm et al.

[11] Patent Number: 5,319,572
[45] Date of Patent: Jun. 7, 1994

[54] ELECTROHYDRAULIC FLUID MONITOR SYSTEM

[75] Inventors: Peter L. Wilhelm; Robert F. Gray, both of Winter Springs; Maurice A. Jenkins, Casselberry, all of Fla.

[73] Assignee: Westinghouse Electric Corp., Pittsburgh, Pa.

[21] Appl. No.: 770,192

[22] Filed: Oct. 2, 1991

[51] Int. Cl.$^5$ .............................. G06F 15/20
[52] U.S. Cl. .............................. 364/510; 364/551.01
[58] Field of Search .................. 364/510, 509, 551.01, 364/494; 395/906, 907, 914, 915; 415/48, 118; 187/17

[56] References Cited

U.S. PATENT DOCUMENTS

| | | | |
|---|---|---|---|
| 3,643,437 | 2/1972 | Birnbaum et al. | 364/552 |
| 4,213,183 | 7/1980 | Barron et al. | 364/552 |
| 4,698,756 | 10/1987 | Gonzalez et al. | 364/551.01 |
| 4,803,040 | 2/1989 | Gross | 395/904 |
| 5,023,045 | 6/1991 | Watanabe et al. | 395/914 |
| 5,056,844 | 11/1991 | Hon | 187/17 |
| 5,073,499 | 12/1991 | Bellows | 364/496 |
| 5,073,862 | 12/1991 | Carlson | 364/551.01 |
| 5,122,976 | 6/1992 | Bellows et al. | 364/580 |
| 5,132,920 | 7/1992 | Bellows et al. | 364/551.01 |
| 5,223,207 | 6/1993 | Gross et al. | 395/914 |

OTHER PUBLICATIONS

Kern et al; "Concept for Combining Features of Real-time and Expert Systems for On-line Plant Diagnosis"; IEEE 1990.
D'Ambrosio et al; "AI in the power plants: PKRF-EXS, a PERFormance diagnostic EXpert System"; IEEE 1988.

*Primary Examiner*—Jack B. Harvey
*Assistant Examiner*—Ellis B. Ramirez
*Attorney, Agent, or Firm*—G. R. Jarosik

[57] ABSTRACT

An electrohydraulic fluid system monitors the fluid line 1, reservoir 2, motor pumps 4 and 6, accumulators 10 and drain line 13 in an electrohydraulic fluid system. The electrohydraulic fluid monitor system includes sensors 14-40 to detect temperature, pressure, fluid level and motor pump current in the electrohydraulic fluid system. Signals from these sensors are converted 54 by an analog to digital converter into digital signals read by a processor unit 58 and stored by the processor unit as data for diagnostic analysis. In one embodiment of the present invention, the processor unit 58 stores the information and compares the information to predetermined threshold amounts or to previous values and outputs a malfunction indication to a status display, responsive to results of these comparisons, which indicates the presence or nonpresence of a malfunction in the electrohydraulic fluid system. In another embodiment of the present invention, the microprocessor outputs the information to an artificial intelligence system 94. The artificial intelligence system 94 applies a set of diagnostic rules from a rule storage 96 to obtain a malfunction diagnosis or hypothesis that indicates other rules to be applied to diagnose the malfunction. As a result, the present invention rapidly detects or diagnoses malfunctions in the electrohydraulic fluid system.

24 Claims, 7 Drawing Sheets

STATUS DISPLAY

| MOTOR STATUS | PUMP STATUS | SYSTEM LEAK |
|---|---|---|
| NORMAL ⑦④ WARNING ⑧⓪ | NORMAL ⑦⑤ WARNING ⑧① | NORMAL ⑦⑥ INTERNAL ⑧② EXTERNAL ⑧③ |
| UNLOADER VALVE MALFUNCTION | HEAT EXCHANGER TUBE LEAK | ACCUMULATOR STATUS |
| NORMAL ⑦⑦ WARNING ⑧⑦ | NORMAL ⑦⑧ WARNING ⑧⑧ | NORMAL ⑦⑨ WARNING ⑧⑨ |

FIG. 4

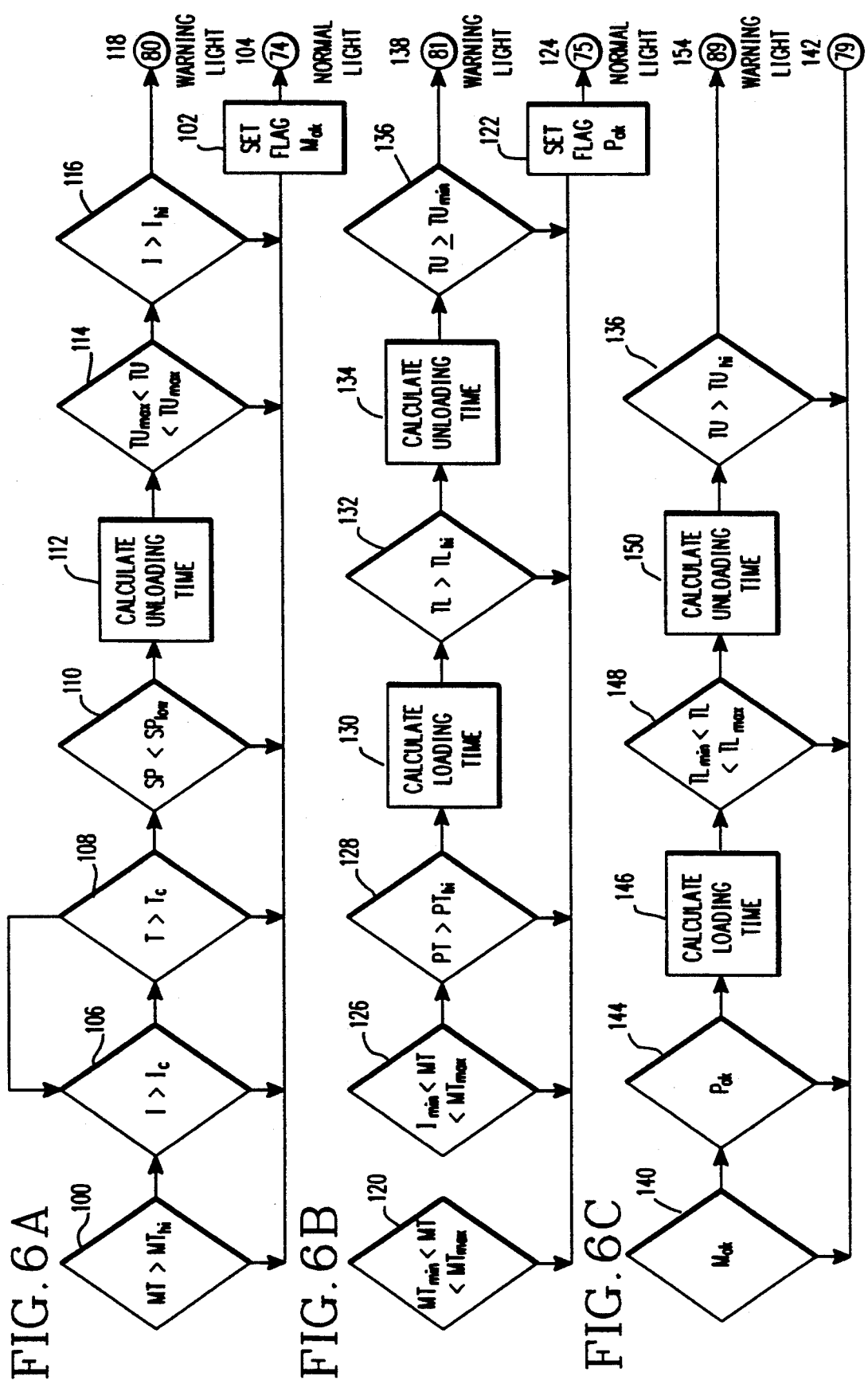

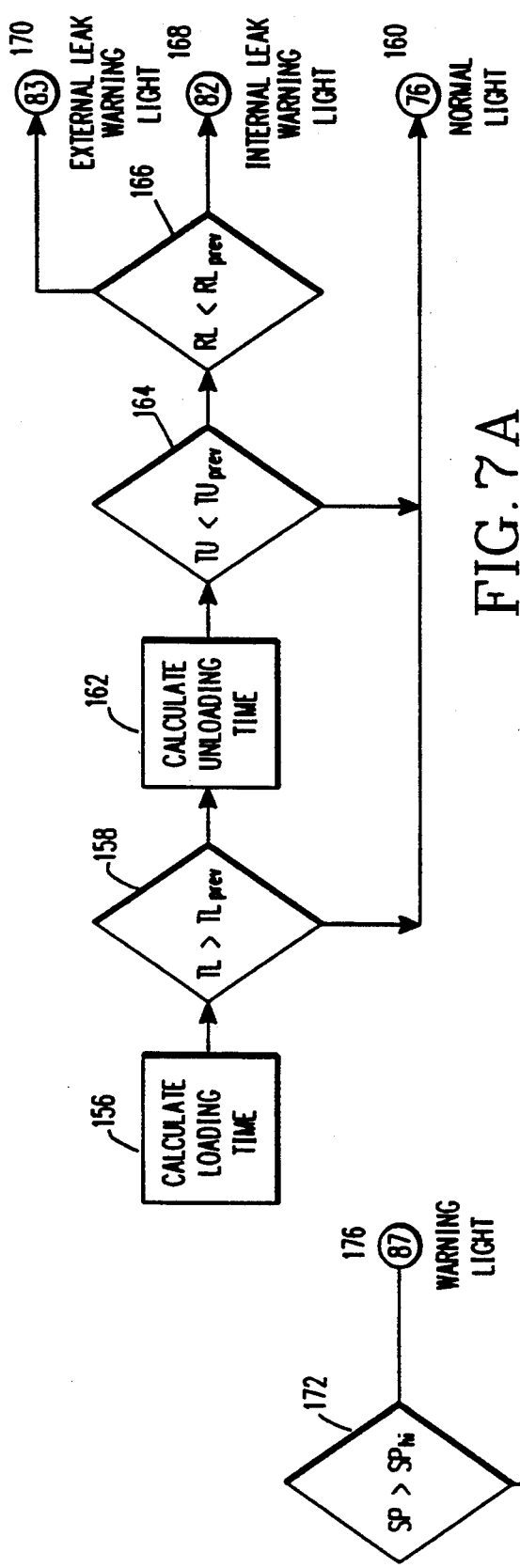
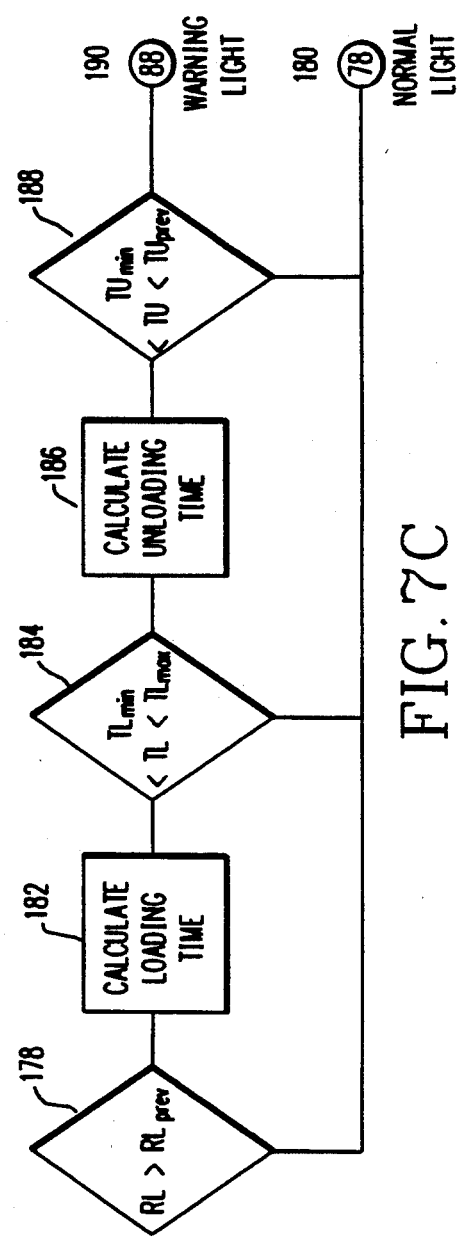
FIG. 7A
FIG. 7B
FIG. 7C

ELECTROHYDRAULIC FLUID MONITOR SYSTEM

BACKGROUND OF THE INVENTION

1. Field of the Invention

The present invention is directed to an electrohydraulic fluid monitor system for detecting malfunctions in an electrohydraulic fluid system and, more particularly, an apparatus and method for monitoring the electrohydraulic fluid, reservoir, motor pump, accumulators and drain line in an electrohydraulic fluid system to detect malfunctions therein.

2. Description of the Related Art

An electrohydraulic fluid system can be used, for example, to operate steam valves in a steam turbine. An example of such an electrohydraulic fluid system is manufactured by Westinghouse and described in IL 1250-3713(1/69) and IL 1250-3713A (7/88) published by Westinghouse. The electrohydraulic fluid system controls the steam valves using high pressure electrohydraulic fluid. FIG. 1 illustrates such an electrohydraulic fluid system, further provided with sensors which will be described, presently. In FIG. 1, electrohydraulic fluid is supplied along electrohydraulic fluid line 1. The electrohydraulic fluid is pumped from the reservoir 2 to steam valves by one of the motor pumps 4 and 6 along the electrohydraulic fluid line 1. One of the motor pumps 4 or 6 operates at a time, while the other is provided as a standby. Each of the motor pumps 4 and 6 have a conventional motor, one of which operates continuously, either driving a conventional pump to pump up pressure in the system (loading) or idling (unloading), during which time the pressure drops. An electrohydraulic control unit 8 is positioned along the electrohydraulic fluid line 1 to control the pressure therein. The control block includes unloader valves, which are conventional pressure valves which open and close to maintain the pressure at a specified range. The unloader valves either divert oil to charge the system or divert it back to the reservoir. Accumulators 10 maintain the pressure in the electrohydraulic fluid line 1. The electrohydraulic fluid is supplied to steam valve hydraulic actuators to actuate steam valves 12 which control steam flow to a steam turbine (not pictured). The electrohydraulic fluid is returned to the reservoir 2 along drain line 13.

An electrohydraulic fluid system such as the one discussed above may serve a very important function, such as in the operation of the steam valves in a steam turbine, as described. For this reason, it is essential that malfunctions in the electrohydraulic system can be detected or diagnosed as quickly as possible.

SUMMARY OF THE INVENTION

An object of the present invention is to detect and indicate malfunctions in an electrohydraulic fluid system.

Another object of the present invention is to diagnose malfunctions in an electrohydraulic fluid system using an artificial intelligence system.

An object of the present invention is to detect motor malfunctions in an electrohydraulic fluid system.

Another object of the present invention is to detect pump malfunctions in a electrohydraulic fluid system.

A further object of the present invention is to detect a malfunction with the accumulators in an electrohydraulic fluid system.

A still further object of the present invention is to detect an internal or external system leak in an electrohydraulic fluid system.

An object of the present invention is to detect an unloader valve malfunction in an electrohydraulic fluid system.

A further object of the present invention is to detect a heat exchanger tube leak in an electrohydraulic fluid system.

The above mentioned objects can be attained by an electrohydraulic fluid monitor system which monitors the electrohydraulic fluid line, reservoir, motor pumps, accumulators and drain line in an electrohydraulic fluid system. The electrohydraulic monitor system includes sensors to detect temperature, pressure, fluid level and motor pump current in the electrohydraulic fluid system. Signals from these sensors are converted by an analog to digital convertor into digital signals read by a microprocessor and stored by the microprocessor as data for diagnostic analysis. In one embodiment of the present invention, the microprocessor stores the information in a temporary storage and compares the information to predetermined threshold amounts or to previous values in the temporary storage, and outputs a malfunction indication to a display responsive to results of these comparisons which indicate the presence or absence of a malfunction in the electrohydraulic fluid system. In another embodiment of the present invention, the microprocessor outputs the information to an artificial intelligence system. The artificial intelligence system applies a set of diagnostic rules to obtain a malfunction diagnosis or hypothesis that indicates other rules to be applied to diagnose the malfunction. As a result, the present invention rapidly detects or diagnoses malfunctions in the electrohydraulic fluid system.

These together with other objects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIG. 4 shows a status display provided in the first embodiment.

FIG. 6A is a flowchart of control performed by the processor in the first embodiment in determining a motor malfunction in the electrohydraulic fluid system.

FIG. 6B is a flowchart of control performed by the processor in the first embodiment in determining a pump malfunction.

FIG. 6C is a flowchart of control performed by the processor in the first embodiment in determining an accumulator malfunction.

FIG. 7A is a flowchart of control performed by the processor in the first embodiment in determining a system leak in the electrohydraulic fluid system.

FIG. 7B is a flowchart of control performed by the processor in the first embodiment in determining an unloader valve malfunction in the electrohydraulic fluid system.

FIG. 7C is a flowchart of control performed by the processor in the first embodiment in determining a heat exchanger tube leak in the electrohydraulic fluid system.

DESCRIPTION OF THE PREFERRED EMBODIMENTS

The present invention detects or diagnoses malfunctions that occur in an electrohydraulic fluid system. In a first embodiment of the present invention the malfunctions are detected and indicated by a display. In a second embodiment of the present invention the malfunctions are diagnosed by an artificial intelligence system.

In both the first and second embodiments of the present invention, sensors are provided in the electrohydraulic fluid system and a monitor is provided which receives input from these sensors, converts the input into digital data and stores and processes the digital data.

Figure 1:
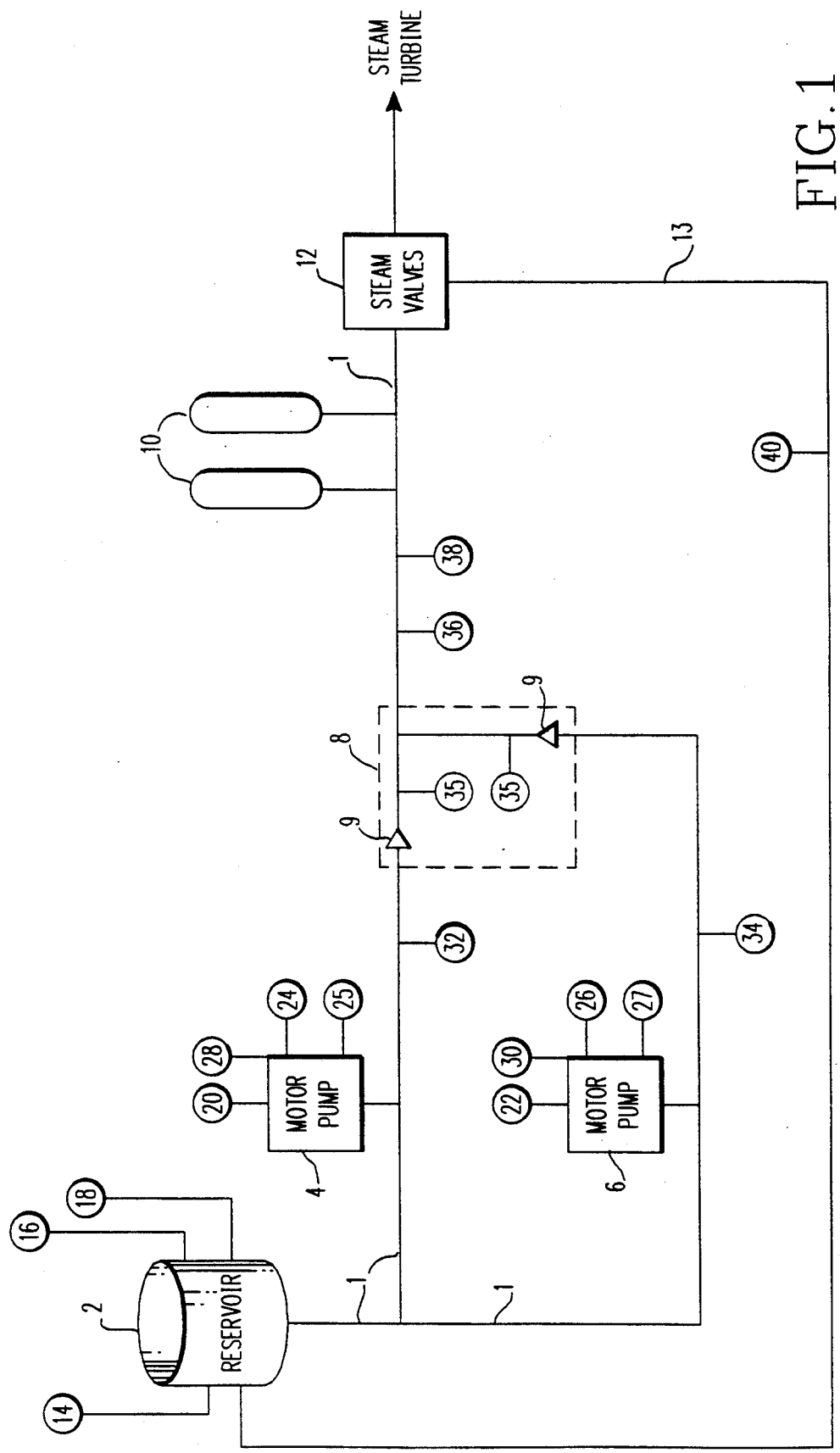
FIG. 1 illustrates an electrohydraulic fluid system and the sensors provided therein by the present invention.

FIG. 1 illustrates the sensors provided by the present invention in the electrohydraulic fluid system. A reservoir fluid level analog sensor 14 measures the fluid level in the reservoir. A first threshold fluid level sensor 16 determines whether the fluid is above a predetermined (high) fluid level or below a predetermined level (low-low). A second fluid level sensor 18 determines whether the fluid is below an first predetermined (low) fluid level or (trip-low) a second fluid level.

First and second motor current sensors 20 and 22 are connected to each motor in the motor pumps 4 and 6, respectively, to measure current produced therein. The current sensors 20 and 22 are conventional current transducers. A first motor temperature sensor 24 is attached to the motor frame to measure temperature in the motor and a first pump temperature sensor 25 is attached to the pump frame to measure temperature in the pump, in motor pump 4. Likewise, a second motor temperature sensor 26 is attached to the motor frame to measure temperature in the motor and a second pump temperature sensor 27 is attached to the pump frame to measure temperature in the pump, in motor pump 6. First and second bearing temperature sensors 28 and 30 measure the motor bearing temperature in each motor in the motor pumps 4 and 6, respectively. The temperature sensors 24, 25, 26, 27, 28 and 30 are conventional thermocouples.

A first motor downstream pressure sensor 32 measures pressure in the fluid line 1 downstream from the motor pump 4. Similarly, the second downstream pressure sensor 34 measures pressure in the fluid line 1 downstream from the motor pump 6. The sensors 32 and 34 are, for example, conventional pressure sensors.

Unloader valve sensors 35 confirm movement of the unloader valves 9 during loading and unloading of the system. The unloader valve sensors 35 are conventional pressure switches and confirm movement of the unloader valves towards increasing pressure during loading and towards decreasing pressure during unloading.

A system pressure sensor 36 measures pressure in the fluid line 1 downstream from the electrohydraulic reservoir control unit 8. The maximum pressure sensor 38 determines whether the pressure in fluid line 1 exceeds a predetermined maximum amount, for example, 1600 psi. Finally, the drain return pressure sensor 40 determines whether pressure in the drain return line 13 exceeds a predetermined minimum amount. The sensors 36, 38 and 40 are also conventional pressure sensors.

Figure 2:
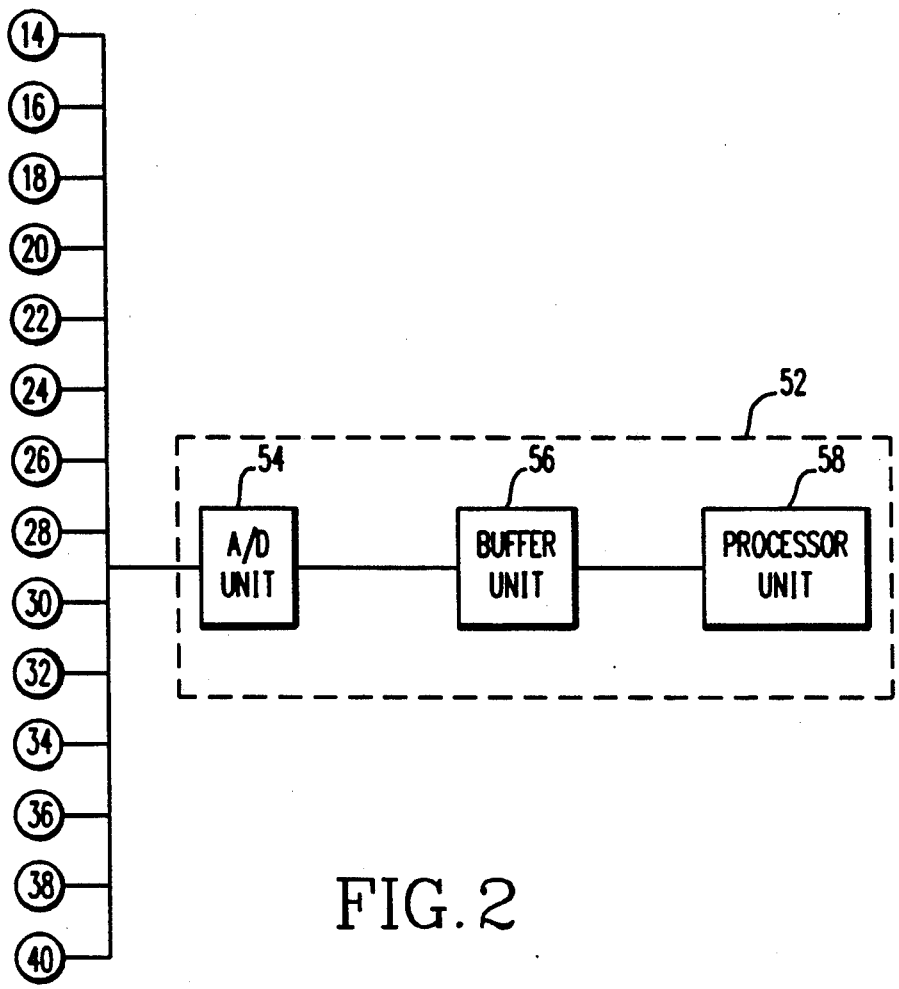
FIG. 2 illustrates an electrohydraulic fluid monitor provided in the electrohydraulic fluid monitor system in the present invention.

FIG. 2 illustrates a electrohydraulic fluid monitor 2 for processing the information collected by the sensors 14–40 discussed above. The electrohydraulic fluid monitor 52 has a conventional analog to digital conversion unit 54 to which signals from the sensors 14–40 are input. The analog to digital conversion unit converts these signals to digital signals and inputs these digital signals to a buffer unit 56. The buffer unit 56 temporarily stores the digital signals. A processor unit 58 utilizes this data, corresponding to the sensor measurements, to detect malfunctions in the electrohydraulic fluid system, or to input information to an artificial intelligence system which diagnoses a malfunction in the electrohydraulic fluid system. An appropriate microprocessor unit could range from printed circuit cards on up.

Figure 3:
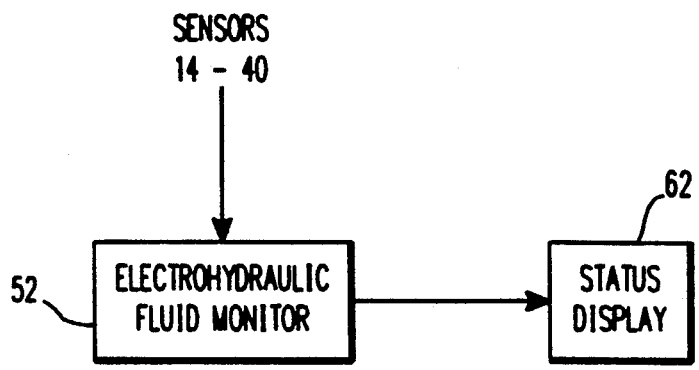
FIG. 3 illustrates a first embodiment of the present invention.

FIG. 3 illustrates a first embodiment of the present invention. In FIG. 3, the electrohydraulic fluid monitor 52 is connected to a status display 62. The processor unit 58 in the electrohydraulic fluid monitor determines whether malfunctions are detected in the electrohydraulic fluid system and outputs the resulting status to the status display 62.

The status display 62 is illustrated in FIG. 4. In FIG. 4, a normal light (for example, green) and a warning light (for example, red) are provided to indicate the detection or nondetection of a potential malfunction relating to the motor, pump, system leakage, unloader valve, heat exchanger, or accumulator. The electrohydraulic fluid monitor interfaces with these light by using a digital output addressable and driving a conventional LED. In FIG. 4, the normal lights 74, 75, 76, 77, 78 and 79 indicate normal conditions regarding motor status, pump status, system leak, unloader valve status, heat exchanger tube leak, and accumulator status, respectively. Warning light 80 indicates a motor malfunction. Warning light 81 indicates a pump malfunction. Warning lights 82 and 83 indicate internal and external system leaks, respectively. Warning light 87 indicates an unloader valve malfunction. Warning light 88 indicates a heat exchanger tube leak. Warning light 89 indicates an accumulator malfunction. The control performed by the processor unit in determining these indications is described below.

Figure 5:
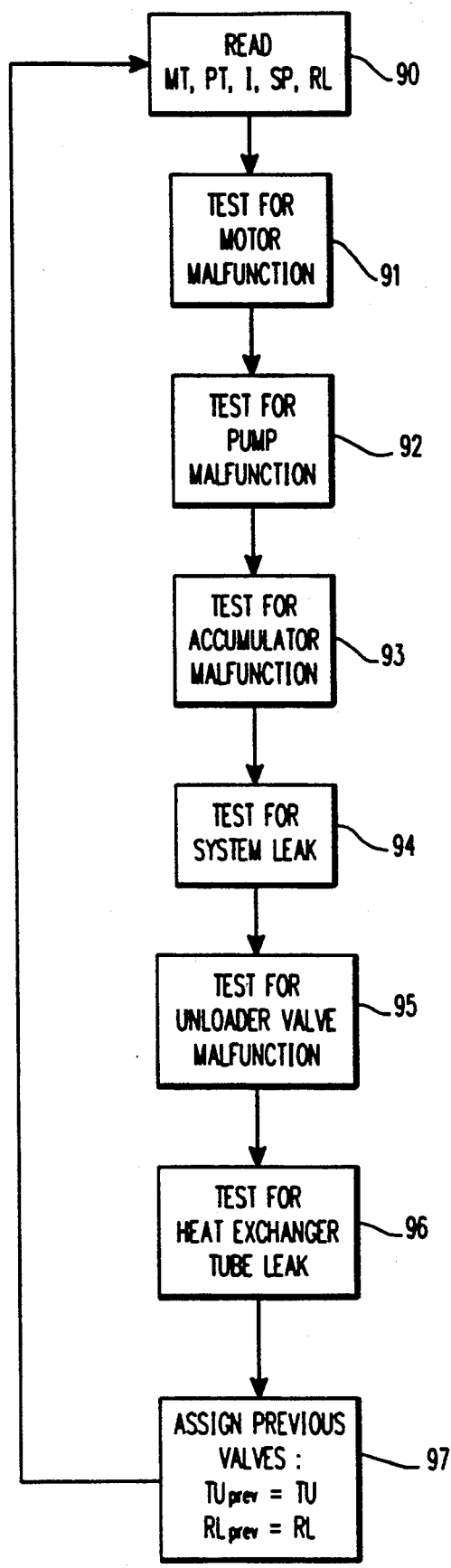
FIG. 5 is a flowchart of control performed by the processor 58.

FIG. 5 is a flowchart of the control performed by the processor 58 in determining malfunctions in the electrohydraulic fluid system. First, the motor temperature MT, pump temperature PT, current I, system pressure SP and reservoir level RL are read 90 by the processor 58. Then, the processor 58 tests 91 for a motor malfunction. This process is described specifically in FIG. 6A. Next, the processor 58 tests 92 for a pump malfunction. This is described in FIG. 6B. Then, the processor 58 tests 93 for an accumulator malfunction, as described in FIG. 6C. Next, the processor 58 tests 94 for a system leak, described in FIG. 7A. Then, the processor 58 tests 95 for an unloader valve malfunction, as described in FIG. 7B. Next, the processor 58 tests 96 for a heat exchanger tube leak. This process is described in FIG. 7C. Finally, current valves RL & TU are assigned 97 as previous values RL & TU assigned 97 as previous valves $RL_{prev}$ and $TU_{prev}$ for use in the next control cycle.

The steps 90-97 are repeated as often as necessary to perform loading and unloading. The typical loading time is, for example, 15 seconds and the unloading time is, for example, 45 seconds during steady state operation. As a result of the tests performed in steps 91-96, the normal or warning lights are illuminated on the status display 62 shown in FIG. 4. This is described in detail below, with reference to the tests for each malfunction.

FIG. 6A is a flowchart of the operations performed by the processor unit 58 in determining whether a possible motor malfunction exists, and hence whether to illuminate the normal light 74 or the warning light 84. First, a motor temperatures MT is measured by the first or second motor temperature sensors 24 or 26 of the motor 4 or 6 currently in operation, and compared 100 to predetermined high threshold motor frame temperature $MT_{high}$ stored in the processor unit 58. If the motor frame temperature does not exceed the predetermined high threshold value, then a flag $M_{ok}$ is set 102 and the motor status normal light 74 is illuminated. If, however, the motor temperature exceeds the predetermined high threshold $MT_{high}$, then control proceeds to perform further testing for a motor malfunction. The current I from the first or second motor current sensors 20 or 22 for the motor 4 or 6 currently in operation, is compared 106 to a predetermined normal charging current $I_c$, stored in the processor unit 58. This comparison is performed continually 108 for a predetermined normal charging time $T_c$ stored in the processor unit 58. If at any time before the predetermined charging time $T_c$ expires, the current I exceeds the predetermined normal full load current drawn by the motor $I_c$ then the flag $M_{ok}$ is set 102 and the motor status normal light 74 is illuminated. As will be explained, the flag $M_{ok}$ is used in detecting other malfunctions based on the fact that the motor is OK. Otherwise, once the time $T_c$ has expired, control proceeds to perform further testing.

The system pressure SP measured by the system pressure sensor 36 is compared 110 to a predetermined low system pressure $SP_{low}$ stored in the processor unit 58. If SP does not fall below $SP_{low}$ then the flag $M_{ok}$ is set 102 and the motor status normal light 74 is illuminated. If, however, SP is below $SP_{low}$, then further testing is performed.

The unloading time in the system is calculated 112 by measuring the time it takes for the system pressure to decrease from the maximum operating pressure to the minimum operating pressure. The unloading time TU is compared 114 to $TU_{min}$ and $TU_{max}$, both stored in the processor unit 58, to determine if the unloading time falls within an acceptable range. If the unloading time TU does not fall within this range, then the flag $M_{ok}$ is set 102 and the motor status normal light 74 is illuminated. If the time TU does fall within this range, then further testing is performed.

The motor current I is compared to a predetermined high motor current $I_{high}$ stored in the processor unit 58. If the motor current I does not exceed $I_{high}$ then the flag $M_{ok}$ is set 102 and the motor status normal light 74 is illuminated. If, however, the motor current I exceeds $I_{high}$, then the combination of measured conditions in the sensors indicates a motor malfunction, and the motor status warning light 80 is illuminated 118.

FIG. 6B illustrates a flowchart of the control performed by the processor unit 58 in determining whether there is a possible pump malfunction, and hence whether to illuminate the pump status normal light 75 or the pump status warning light 81. First, the motor temperatures MT are compared 120 to predetermined minimum and maximum temperatures $MT_{min}$ and $MT_{max}$ to determine whether motor temperature falls within an acceptable range. If either motor temperature MT does not fall within this range, then the flag $P_{ok}$ is set 122 and the pump status normal light 75 is illuminated 124. As will be explained, the flag $M_{ok}$ is used to detect other malfunctions based on the fact that the pump is OK. Otherwise, control proceeds to perform further testing for a pump malfunction.

The motor current I is compared 126 to minimum and maximum predetermined motor currents $I_{min}$ and $I_{max}$ stored in the processor unit 58 to determine whether the motor current I falls within a normal range. If the motor current I does not fall within this range, then the flag $P_{ok}$ is set 122 and the pump status normal light 75 is illuminated. Otherwise, further testing is performed.

The pump temperatures P2 measured by the pump frame temperature sensors 25 and 27 are compared 128 to a predetermined high pump temperature $PT_{high}$. If all the pump temperatures PT do not exceed $PT_{high}$ then the flag $P_{ok}$ is set 122 and the pump status normal light 75 is illuminated 124. Otherwise, control proceeds to perform further testing.

The loading time TL of the system is calculated 130 by measuring the time it takes for the system pressure to increase from the minimum operating pressure to the maximum operating pressure. Next, the loading time TL is compared 132 to a predetermined high threshold loading time $TL_{high}$. If the loading time TL does not exceed $TL_{high}$, then the flag $O_{ok}$ is set 122 and the pump status normal light 75 is illuminated. Otherwise, further testing is performed.

The unloading time is calculated 134 in the same manner as in step 112 discussed above. If the unloading time TU is less than a previous unloading time $TU_{prev}$, then the flag $P_{ok}$ is set 122 and the pump status normal light 75 is illuminated. If, however, the unloading time TU is determined in step 136 to be normal, then the combination of factors detected by the sensors indicates a pump malfunction, and the pump status warning light 85 is illuminated 138.

FIG. 6C is a flowchart of the control performed by the processor unit 58 in determining whether a potential accumulator malfunction exists, and hence whether to illuminate the accumulator status normal light 79 or the accumulator status warning light 89. First, it is determined 140 whether the flag $M_{ok}$ has been set. If not, the accumulator status normal light 79 is illuminated 142. If, however, the motor status is o.k., further testing is performed, and it is determined 144 whether the flag $P_{ok}$ has been set. If not, the accumulator status normal light 79 is illuminated. Otherwise, since both the motor status and pump status are o.k., control proceeds to perform further testing of the accumulator status.

The loading time TL is calculated 146 in the same manner as in step 130 discussed above. The loading time TL is compared 148 to the predetermined minimum and maximum loading times $TL_{min}$ and $TL_{max}$ stored in the processor unit 58 to determine whether the loading time TL falls within a normal loading time range. If not, the accumulator status normal light 79 is illuminated. Otherwise, further testing is performed.

The unloading time TU is calculated 150 in the same manner as in steps 112 and 134 discussed above. The unloading time TU is compared 152 to a predetermined threshold high unloading time $TU_{high}$. If the unloading time does not exceed $TU_{high}$ then the accumulator status normal light 79 is illuminated. If however, the unloading time TU exceeds $TU_{high}$, then the combination of sensor measurement indicates an accumulator malfunction, and the accumulator status warning light 89 is illuminated 154.

FIG. 7A is a flowchart of the control performed by the processor unit 58 to detect a system leak in the electrohydraulic fluid system and to determine whether to illuminate the normal light 76, internal light 82 or external light 83 in the status display 62. First, the loading time TL is calculated 156 in the same manner as in steps 130 and 146 discussed above. The loading time TL is compared 158 to a previous loading time $TL_{prev}$ processor unit 58 stored in the buffer unit 56. If the loading time TL is not increasing, then the system leak normal light 76 is illuminated 160. If, however, the loading time is increasing, then control proceeds to calculate 160 the unloading time TU in the same manner as in steps 112, 134 and 150 discussed above. The unloading time is compared 164 to a previous unloading time $TU_{prev}$ stored in the buffer unit 56. If the unloading time is not increasing then the system leak normal light 76 is illuminated. If, however, both the loading time is increasing and the unloading time is decreasing, then a system leak is indicated and control proceeds to 166, where the reservoir level RL measured by the reservoir fluid level sensor 14 is compared to a previous reservoir level $RL_{prev}$ stored in the buffer unit 56. If the reservoir level is not decreasing, then the system leak internal light 82 is illuminated 168. However, if the reservoir level is decreasing, then the system leak external light 96 is illuminated 170.

FIG. 7B illustrates a flowchart of the control performed by the processor unit 58 in detecting an unloader valve malfunction. The system pressure SP is compared 172 to a predetermined system pressure $SP_{high}$ stored in the processor unit 58. If the system pressure does not exceed $SP_{high}$, then the unloader valve normal light 77 is illuminated 174. If, however, the system pressure exceeds $SP_{high}$ then the unloader valve warning light 87 is illuminated 176.

FIG. 7C illustrates a flowchart of the control performed by the processor unit 58 in detecting a heat exchanger tube leak in the electrohydraulic fluid system, and hence determining whether to illuminate the heat exchanger normal light 78 or the heat exchanger warning light 88. First, the reservoir level RL is compared 178 to the previous reservoir level $RL_{prev}$. If the reservoir level does not exceed the $RL_{prev}$, then the heat exchanger normal light 78 is illuminated IBO. If the reservoir level RL exceeds $RL_{prev}$, then the loading time TL is calculated 182 in the same manner as in steps 130, 146 and 156. The loading time TL is compared 184 to $TL_{min}$ and $TL_{max}$ to determine whether the loading time TL falls within a normal loading time range. If not, the heat exchanger normal light 78 is illuminated. If the loading time TL falls within the normal range, then the unloading time TU is calculated 186 in the same manner as in steps 112, 134, 150 and 162. The unloading time TU is compared 188 to $TU_{min}$ and $TU_{max}$ to determine if the unloading time falls within a normal range. If not, the heat exchanger normal light 78 is illuminated. If the unloading time TU does fall within the normal range, then the combination of measurements by the sensors indicates a heat exchanger tube leak, and the heat exchanger warning light 88 is illuminated 190.

Figure 8:
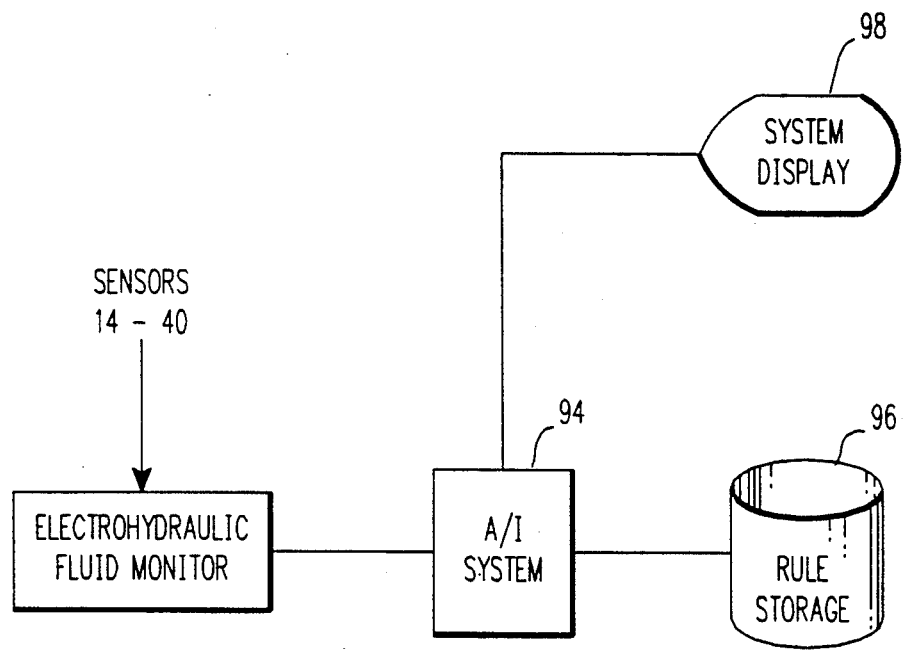
FIG. 8 illustrates a second embodiment of the present invention.

FIG. 8 illustrates a second embodiment of the present invention. In FIG. 8, the electrohydraulic fluid monitor 52 is connected by a serial or parallel communication line to an artificial intelligence system 94 which takes the measurements obtained by the sensors 14–40 and performs a more sophisticated diagnosis of the malfunctions within the electrohydraulic fluid system. The artificial intelligence system 94 is, for example, a system such as TurbinAid TM, a diagnostic expert system available from Westinghouse Electric Corporation. The expert system embodied in the TurbinAid TM system is described, for example, in U.S. Pat. No. 4,644,479 to Kemper. The artificial intelligence system 94 utilizes a knowledge base 96 which has rules that can be applied to the sensor information in determining the malfunctions. The artificial intelligence system 94 is also connected to a system display 98 on which these malfunctions can be indicated.

In the second embodiment, the processor unit 58 serves as a signal/sensor input means (diagnostic input means) which provides input information for the artificial intelligence system 94. The artificial intelligence system 94 diagnoses malfunctions in the electrohydraulic fluid system using this information. The artificial intelligence system 94 receives the sensor information and applies rules from the knowledge base 96 that correspond to the sensor information. Based on the sensor information, each applicable rule indicates one or more hypotheses with a degree of certainty expressed by a confidence factor, between $-1.0$ and $1.0$, where "+1.0" is the measure of belief by the computer that the condition exists. A "$-1.0$" indicates that the condition does not exist. Each hypothesis either indicates a malfunction or leads to the diagnosis of a malfunction by indicating one or more rules to be applied in the diagnosis. The rules of the knowledge base 96 can be created, for example, from the logic described with respect to FIGS. 5–7C. Each of the sensors in the electrohydraulic fluid system are labelled and stored in the knowledge base 96 and the rules supported by the sensors are referenced by the sensor labels. Each hypothesis is referenced by the rules which indicate the hypothesis, and the rules and malfunctions which the hypothesis indicates.

More specifically, data corresponding to the sensors 14–40 is input to the artificial intelligence system 94. Based on the data with regard to certain of these sensors, particular rules are applied. For example, if a measurement from a particular sensor exceeds a predetermined amount, then a rule is applied indicating, with a $-1.0$ to $+1.0$ confidence factor, a hypothesis regarding a malfunction of a part of the electrohydraulic fluid system to which the particular sensor is attached. This hypothesis may be combined with other hypotheses to indicate, with a $-1.0$ to $+1.0$ confidence factor, a diagnosis of a potential malfunction of the part to which the sensor is attached. Alternatively, the hypothesis regarding the part to which the sensor is attached may indicate a diagnosis of a potential malfunction of a different part.

By providing the monitor system in the present invention in an electrohydraulic fluid system, malfunctions that occur in the electrohydraulic fluid system can be rapidly detected and indicated or diagnosed. As a result, the electrohydraulic fluid system can be maintained effectively to operate as reliably as possible.

In another embodiment of the invention the unloader valves can be controlled by a mechanical hydraulic method, or electrically actuated by a solenoid instead. The solenoid would provide, for example, a digital contact signal indicating the position of the unloader valve. The solenoid method would thus provide another means that could be used for determining cycle times (loading and unloading) between minimum and maximum pressure.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for monitoring an electrohydraulic fluid system controlling steam valves in a steam turbine, and having a reservoir holding electrohydraulic fluid, motor pumps supplying the electrohydraulic fluid along an electrohydraulic fluid line, a control block controlling the electrohydraulic fluid line, and accumulators maintaining pressure in the electrohydraulic fluid line, said apparatus comprising:

reservoir sensors measuring a level of electrohydraulic fluid in the reservoir;

motor pump sensors measuring motor temperature, pump temperature and motor current in the motor pumps, and measuring pressure in the electrohydraulic fluid line downstream from the motor pumps;

system pressure sensors measuring system pressure in the electrohydraulic fluid line downstream from the control block;

a memory device containing a plurality of test values;

detecting means for calculating loading time and unloading time of the steam valves based on the current in the motor pumps, and for determining malfunctions in the electrohydraulic fluid system based on measurements of said reservoir sensors, motor pump sensors and system pressure sensors as compared to said plurality of test values; and display means for displaying information indicating the malfunctions in the electrohydraulic fluid system detected by said detecting means.

2. An apparatus according to claim 1, wherein
said detecting means detects a motor malfunction when the unloading time is within a normal unloading time range, the motor temperature measured by said motor pump sensor means is above a maximum motor temperature, the motor current measured by said motor pump sensor means is above a maximum motor current, and the system pressure measured by said system pressure sensors is below a minimum system pressure, and
said display means indicates the motor malfunction detected by said detecting means.

3. An apparatus according to claim 1, wherein
said detecting means detects a pump malfunction when the unloading time is within a normal unloading time range, the loading time is above a normal loading time, the motor temperature measured by said motor pump sensor means is within a normal motor temperature range, the motor current measured by said motor pump sensor means is within a normal current range, and the pump temperature measured by said motor pump sensor means is above normal pump temperature, and
said display means indicates the pump malfunction detected by said detecting means.

4. An apparatus according to claim 1, wherein
said detecting means detects an accumulator malfunction when no motor malfunction is detected, no pump malfunction is detected, the loading time is within a normal loading time range, and the unloading time to be above a normal unloading time, and
said display means indicates the accumulator malfunction detected by said detecting means.

5. An apparatus according to claim 1, wherein
said detecting means detects an internal system leak when the loading time has increased, and the unloading time has decreased, and
said detecting means detects the level of electrohydraulic fluid in the reservoir measured by said reservoir sensor means to be within a normal range, and
said display means indicates the internal system leak detected by said detecting means.

6. An apparatus according to claim 1, wherein
said detecting means detects an external system leak when the loading time has increased, the unloading time has decreased, the level of electrohydraulic fluid in the reservoir measured by said reservoir sensor means is decreasing, and said display means indicates the external system leak detected by said detecting means.

7. An apparatus according to claim 1, wherein
said detecting means detects an unloader valve malfunction when the system pressure measured by said system pressure sensors is above a maximum system pressure or below a minimum system pressure, and said display means indicates the unloader valve malfunction detected by said detecting means.

8. An apparatus according to claim 1, wherein
said detecting means detects a heat exchanger malfunction when the reservoir level measured by said reservoir sensor means is increasing, the loading time is within a normal loading time range, and the unloading time is within a normal unloading time range, and said display means indicates the heat exchanger malfunction detected by said detecting means.

9. A method of monitoring an electrohydraulic fluid system controlling steam valves in a steam turbine and having a reservoir holding electrohydraulic fluid, motor pumps supplying the electrohydraulic fluid along an electrohydraulic fluid line, a control block controlling the electrohydraulic fluid line, and accumulators maintaining pressure in the electrohydraulic fluid line, said method comprising the steps of:

(a) measuring a level of the electrohydraulic fluid in the reservoir;

(b) measuring motor temperature, pump temperature and motor current in the motor pumps, and pressure in the electrohydraulic fluid line downstream from the control block;

(c) measuring system pressure in the electrohydraulic fluid line downstream from the control block;

(d) calculating loading time and unloading time for the steam valves based on the current in the motor pumps;

(e) reading a plurality of test values from a memory device and detecting the malfunctions in the electrohydraulic fluid system based on measurements of said reservoir sensors, motor pump sensors and system pressure sensors as compared to said test values; and (f) displaying information indicating the malfunctions in the electrohydraulic fluid system detected in step (e).

10. A method according to claim 9, wherein step (e) comprises the steps of:

(e1) calculating whether the unloading time is within a normal unloading time range;

(e2) calculating whether the motor temperature is above a maximum motor temperature;

(e3) calculating whether the motor current is above a maximum motor current;

(e4) calculating whether the system pressure is below a minimum system pressure, and wherein step (f) comprises the step of displaying information indicating a motor malfunction when step (e1) calculates the unloading time to be within a normal unloading time range, step (e2) calculates the motor temperature to be above a maximum motor temperature, step (e3) calculates the motor current to be above a maximum motor current, and step (e4) calculates the system pressure to be below a minimum system pressure.

11. A method according to claim 9, wherein step (e) comprises the steps of:

(e1) calculating whether the unloading time is within a normal unloading time range;

(e2) calculating whether the loading time is above a maximum loading time;

(e3) calculating whether the motor temperature is within a normal motor temperature range;

(e4) calculating whether the pump temperature is above a maximum pump temperature; and (e5) calculating whether the motor current is within a normal motor current range; and wherein step (f) comprises the step of displaying information indicating a pump malfunction when step (e1) calculates the unloading time to be within a normal unloading time range, step (e2) calculates the loading time to be above a maximum loading time, step (e3) calculates the motor temperature to be within a normal motor temperature range, step (e4) the pump temperature to be above a maximum motor current, and step (e5) calculates the motor current to be within a normal motor current range.

12. A method according to claim 9, wherein step (e) comprises the steps of:

(e1) detecting no motor malfunction;

(e2) detecting no pump malfunction;

(e3) calculating whether the loading time is within a normal loading time range; and (e4) calculating whether the unloading time is above a normal unloading time, and wherein step (f) comprises the step of displaying information indicating an accumulator malfunction when no motor malfunction is detected in step (e1), no pump malfunction is detected in step (e2), step (e3) calculates the loading time to be within a normal loading time range, and step (e4) calculates the unloading time to be above a normal unloading time.

13. A method according to claim 9, wherein step (e) comprises the steps of:

(e1) calculating whether the loading time has increased;

(e2) calculating whether the unloading time has decreased; and (e3) determining whether the level of electrohydraulic fluid in the reservoir is within a normal range; and wherein step (f) comprises the step of displaying information indicating an internal system leak when step (e1) calculates that the loading time has increased, when step (e2) calculates that the unloading time has decreased, and when step (e3) determines that the level of electrohydraulic fluid is within the normal range.

14. A method according to claim 9, wherein step (e) comprises the steps of:

(e1) calculating whether the loading time has increased;

(e2) calculating whether the unloading time has decreased; and (e3) determining whether the level of electrohydraulic fluid in the reservoir is decreasing, and wherein step (f) comprises the step of displaying information indicating an external system leak when step (e1) calculates that the loading time has increased, when step (e2) calculates that the unloading time has decreased, and when step (e3) determines that the level of electrohydraulic fluid is decreasing.

15. A method according to claim 9, wherein step (e) comprises the steps of:

(e1) determining whether the system pressure is above a maximum system pressure; and (e2) determining whether the system pressure is below a minimum system pressure, and wherein step (f) comprises the step of displaying information indicating an unloader valve malfunction when step (e1) determines that the system pressure is above a maximum system pressure, or when step (e2) determines that the system pressure is below a minimum system pressure.

16. A method according to claim 9, wherein step (e) comprises the steps of:

(e1) determining whether the level of hydraulic fluid in the reservoir is increasing;

(e2) calculating whether the loading time is within a normal loading time range; and (e3) calculating whether the unloading time is within a normal unloading time range, and wherein step (f) comprises the step of displaying information indicating a heat exchanger malfunction when step (e1) determines that the level of hydraulic fluid is increasing, step (e2) calculates the loading time to be within a normal loading time range, and step (e3) calculates the unloading time to be within a normal unloading time range.

17. An apparatus for monitoring an electrohydraulic fluid system having operating conditions including operating temperatures, operating fluid pressures, and operating currents, the apparatus comprising:

a plurality of sensors for generating readings based upon measurements of at least one of the operating conditions within the electrohydraulic fluid system;

a memory device having a plurality of test values;

a processor associated with the plurality of sensors and the memory device for comparing the readings against at least one of the plurality of test values and determining therefrom if a malfunction exists in the electrohydraulic fluid system;

an artificial intelligence device associated with the processor and having a knowledge base containing rules applicable to the readings for generating a diagnosis of the malfunction; and a display device associated with the processor for displaying the diagnosis of the malfunction.

18. An apparatus according to claim 17, wherein said artificial intelligence means applies the rules based on a confidence factor.

19. A method for monitoring an electrohydraulic fluid system having operating conditions including operating temperatures, operating fluid pressures, and operating current, the method comprising:

generating readings based upon measurements from a plurality of sensors of at least one of the operating conditions within the electrohydraulic fluid system;

reading at least one test value from a plurality of test values in a memory device;

comparing the readings in a processor against the at least one test value and determining therefrom if a malfunction exists in the electrohydraulic fluid system;

generating a diagnosis of the malfunction in an artificial intelligence device having a knowledge base containing rules by applying the rules to the readings; and displaying the diagnosis on a display device.

20. A method according to claim 19, wherein generating a diagnosis further comprises applying the rules based on a confidence factor.

21. An apparatus for monitoring an electrohydraulic fluid system used to control steam valves in a steam turbine wherein the electrohydraulic fluid system comprises a reservoir for holding a hydraulic fluid, hydraulic fluid lines associated with the reservoir, electric motor pumps for moving the hydraulic fluid within the hydraulic fluid lines, a control block for controlling the flow of the hydraulic fluid within the hydraulic fluid lines, and accumulators for maintaining the pressure within the hydraulic fluid lines, the apparatus comprising:

reservoir sensors for generating reservoir readings indicative of the hydraulic fluid level in the reservoir;

motor pump sensors for generating motor pump readings indicative of motor pump operating temperatures, motor pump current usage, and motor pump downstream hydraulic fluid pressures;

system pressure sensors for generating system pressure readings indicative of control block downstream hydraulic fluid pressures;

a memory device having a plurality of test values;

a processor associated with the reservoir sensors, the motor pump sensors, the system pressure sensors, and the memory device for calculating a loading time and an unloading time of the steam valves based upon the motor pump readings for further comparing the reservoir readings, motor pump readings, and system pressure readings against the plurality of test values and determining therefrom if a malfunction exists in the electrohydraulic fluid system; and a display device associated with the processor for indicating if a malfunction exists in the electrohydraulic fluid system.

22. A method of monitoring an electrohydraulic fluid system used to control steam valves in a steam turbine wherein the electrohydraulic fluid system comprises a reservoir for holding a hydraulic fluid, hydraulic fluid lines associated with the reservoir, electric motor pumps for moving the hydraulic fluid within the hydraulic fluid within the hydraulic fluid lines, and accumulators for maintaining the pressure within the hydraulic fluid lines, the apparatus comprising:

generating reservoir readings from sensors associated with the reservoir indicative of the hydraulic fluid level in the reservoir;

generating motor pump readings from sensors associated with the motor pump indicative of motor pump operating temperatures, motor pump current usage, and motor pump downstream hydraulic fluid pressures;

generating system pressure readings from sensors associated with the control block indicative of control block downstream hydraulic fluid pressures;

reading a plurality of test values from a memory device;

comparing the reservoir readings, motor pump readings, and system pressure readings in a processor against the plurality of test values and determining therefrom if a malfunction exists in the electrohydraulic fluid system; and displaying on a display device the malfunction.

23. The method as recited in claim 22, further comprising calculating a loading time and an unloading time of the steam valves in the processor based upon the motor pump readings.

24. The method as recited in claim 23, further comprising generating a diagnosis of the malfunction in an artificial intelligence device having a knowledge base containing rules by applying the rules to the reservoir readings, motor pump readings, and system pressure readings and subsequently displaying the diagnosis on the display device.

* * * * *